US011550683B2

(12) United States Patent
Gautam et al.

(10) Patent No.: US 11,550,683 B2
(45) Date of Patent: Jan. 10, 2023

(54) FAULT DEFINITION AND INJECTION PROCESS TO SIMULATE TIMING BASED ERRORS IN A DISTRIBUTED SYSTEM

(71) Applicant: EMC IP Holding Company LLC, Hopkinton, MA (US)

(72) Inventors: Shefali Gautam, San Mateo, CA (US); George Mathew, Belmont, CA (US); Mukesh K. Sharma, Wakad Pune (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/226,466

(22) Filed: Apr. 9, 2021

(65) Prior Publication Data

US 2022/0327037 A1 Oct. 13, 2022

(51) Int. Cl.
*G06F 11/00* (2006.01)
*G06F 11/26* (2006.01)
*G06F 11/14* (2006.01)

(52) U.S. Cl.
CPC .......... *G06F 11/26* (2013.01); *G06F 11/1469* (2013.01)

(58) Field of Classification Search
CPC .. G06F 11/26; G06F 11/1469; G06F 11/0709; G06F 11/28; G06F 11/3006; G06F 11/3664
See application file for complete search history.

(56) References Cited

U.S. PATENT DOCUMENTS

| | | | | |
|---|---|---|---|---|
| 9,086,454 B2 * | 7/2015 | Lin | .......................... | G06F 30/20 |
| 2015/0161025 A1 * | 6/2015 | Baset | ................... | G06F 11/2028 |
| | | | | 714/38.1 |
| 2015/0193319 A1 * | 7/2015 | Southern | ............... | G06F 11/263 |
| | | | | 714/41 |
| 2018/0060202 A1 * | 3/2018 | Papak | .................. | G06F 11/3409 |
| 2020/0301798 A1 * | 9/2020 | Cardoso | ................ | G06F 11/261 |

* cited by examiner

*Primary Examiner* — Joseph D Manoskey
(74) *Attorney, Agent, or Firm* — Staniford Tomita LLP

(57) ABSTRACT

Embodiments for simulating timing-related error conditions in a distributed system, by allowing a user to define a fault map specifying one or more faults to be committed by components in the distributed system. These generated fault events are to be executed in different components of the distributed system in a serialized distributed order. An event injection process delivers the fault map messages to the nodes in the distributed system, and the nodes then execute an operation sequence containing the fault events in the proper order as coordinated by the event injection process. The faults are then committed by the associated components in the nodes. Execution of these fault events occurs before, after or during a regular component procedure or action to simulate the desired timing-related error.

14 Claims, 8 Drawing Sheets

200

| 202 | 204 | 206 | 208 |
|---|---|---|---|
| Action | Node | Component | Action |
| 1 | N2 | Messaging Layer | Send message (to write X to disk) to N1 |
| 2 | N1 | Messaging Layer | Receive message (to write X to disk) from N2 |
| 3 | N1 | Disk Writer | Write X to disk |
| 4 | N1 | Messaging Layer | Send message (write completed) to N2 |
| 5 | N2 | Messaging Layer | Send message (to write X to disk) to N3 |
| 6 | N3 | Messaging Layer | Receive message (to write X to disk) from N2 |
| 7 | N3 | Disk Writer | Write X to disk |
| 8 | N3 | Messaging Layer | Send message (write completed) to N2 |
| 9 | N2 | Disk Writer | Write X to disk |

| Fault No. | Fault Type | Executing Node | RemoteNode | Component | Action |
|---|---|---|---|---|---|
| 1 | FailDiskWrite | N3 | N2 | DiskWriter | Fail one "Write to disk" |

| Action | Node | Component | Action |
|---|---|---|---|
| 1 | N2 | Messaging Layer | Send message (to write X to disk) to N1 |
| 2 | N1 | Messaging Layer | Receive message (to write X to disk) from N2 |
| 3 | N1 | Disk Writer | Write X to disk |
| 4 | N1 | Messaging Layer | Send message (write completed) to N2 |
| 5 | N2 | Messaging Layer | Send message (to write X to disk) to N3 |
| 6 | N3 | Messaging Layer | Receive message (to write X to disk) from N2 |
| 7 | N3 | Disk Writer | FAIL |
| 8 | N3 | Messaging Layer | Send message (write Failed) to N2 |
| 9 | N2 | Disk Writer | Write X to disk |

FIG. 4

500 

| Fault No. | Fault Type | Executing Node | Remote Node | Component | Action |
|---|---|---|---|---|---|
| 1 | Notify_and_wait_before_send | N3 | N2 | Messaging layer | Before sending message "write to disk" to N2, notify the event framework and wait in current thread |
| 2 | Shutdown_transaction_manager | N2 | | Transaction manager | Upon instruction from framework, shutdown transaction manager |
| 3 | Resume_before_send | N3 | | Messaging Layer | Once waiting thread get woken up by the framework, resume execution (and send the message to N2) |

FIG. 5

FAULT DEFINITION AND INJECTION PROCESS TO SIMULATE TIMING BASED ERRORS IN A DISTRIBUTED SYSTEM

TECHNICAL FIELD

Embodiments are generally directed to distributed networks, and specifically to simulating timing-based error conditions using a defined fault map and fault injection process.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Clustered network systems represent a scale-out solution to single node systems by providing networked computers that work together so that they essentially form a single system. Each computer forms a node in the system and runs its own instance of an operating system. The cluster itself has each node set to perform the same task that is controlled and scheduled by software.

A distributed file system is a type of file system in which data may be spread across multiple storage devices. The distributed file system can present a global namespace to clients in a cluster accessing the data so that files appear to be in the same central location. Distributed file systems are typically very large and may contain many hundreds of thousands or even many millions of files.

Any distributed system that involves complex coordination of processing and data between its various components is hard to implement and test. Testing for error conditions is particularly challenging when an error involves multiple components acting in a certain predetermined order. Most of these types of timing-based error conditions are nearly impossible to manually reproduce. However, such error conditions are the ones that are typically most expected to be reproduced in real-life deployments of the distributed system. Therefore, it is imperative that such error conditions are simulated as much as possible so that design challenges and defects in the underlying code can be identified. The ability to simulate such hard timing-based error conditions is needed not only during software development when simulating such error conditions can potentially catch improper system designs, but also during software deployment when a real-life error condition in deployment of the distributed system is needed to identify and fix defects in the code. Such timing-based error conditions almost always require a sequence of individual errors to occur in the distributed system in a predetermined timing-based order.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Dell and EMC are trademarks of Dell/EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 2 is a table that illustrates a typical flow of actions for an example write operation executed in an example three-node network, under an example embodiment.

FIG. 3 is a table that illustrates an example fault event message for the operation sequence of FIG. 2.

FIG. 4 is a table that illustrates the operation sequence of FIG. 2 proceeding with the fault of FIG. 3.

FIG. 5 is a table 500 illustrating an example fault map for a distributed write operation, under an example embodiment.

DETAILED DESCRIPTION

Figure 1:
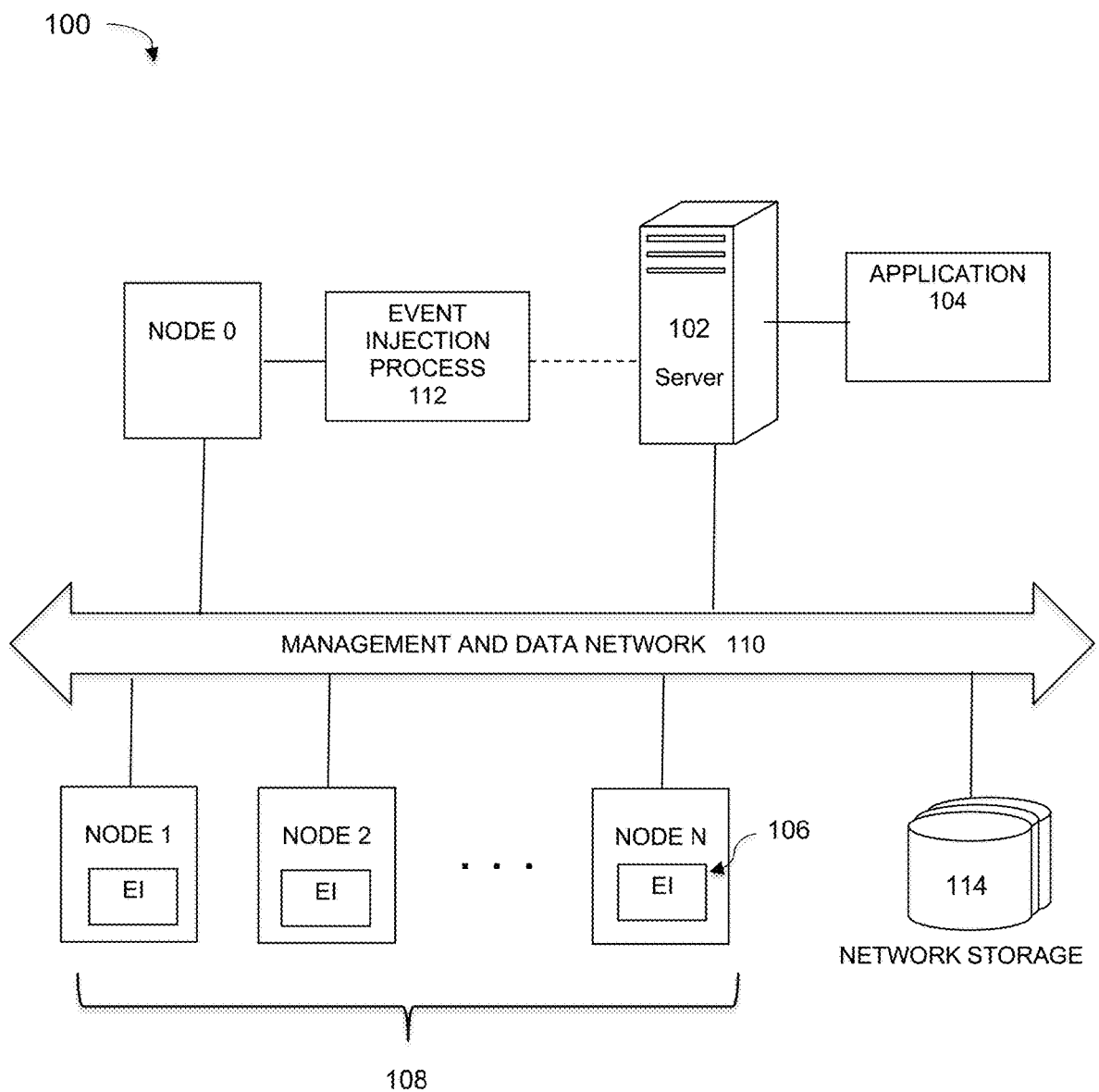
FIG. 1 is a block diagram of illustrating a distributed system implementing an event injection process, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the described embodiments.

Embodiments are directed to a system and method that can be used to simulate error conditions in a distributed system, especially those conditions that are timing related and almost impossible to manually reproduce. Such timing based errors involve a sequence of events that need to occur in a particular order in different components of the distributed system.

FIG. 1 is a block diagram of illustrating a distributed system implementing an event injection process, under some embodiments. System 100 comprises a large-scale network that includes a number of different devices, such as server or client computers 102, nodes 108, storage devices 114, and other similar devices or computing resources. Other networks may be included in system 100 including local area network (LAN) or cloud networks, and virtual machine (VM) storage or VM clusters. These devices and network resources may be connected to a central network, such as a data and management network 110 that itself may contain a number of different computing resources (e.g., computers, interface devices, and so on). FIG. 1 is intended to be an example of a representative system implementing a distributed computing system under some embodiments, and many other topographies and combinations of network elements are also possible.

A distributed system typically consists of various components (and processes) that run in different computer systems (also called nodes) that are connected to each other. These components communicate with each other over the network via messages and based on the message content, they perform certain acts like reading data from the disk into memory, writing data stored in memory to the disk, perform some computation (CPU), sending another network message to the same or a different set of components and so on. These acts, also called component actions, when executed in time order (by the associated component) in a distributed system would constitute a distributed operation.

A distributed system may comprise any practical number of compute nodes 108. For system 100, n nodes 108 denoted Node 1 to Node N are coupled to each other and server 102 through network 110. Theses client compute nodes may include installed agents or other resources to process the data of application 104. The application at the server 102 communicates with the nodes via the control path of network 110 and coordinates with certain agent processes at each of the nodes 108 to perform application functions of the distributed file system.

The network 110 generally provide connectivity to the various systems, components, and may be implemented using protocols such as Transmission Control Protocol (TCP) and/or Internet Protocol (IP), well known in the relevant arts. In a cloud computing environment, the applications, servers and data are maintained and provided through a centralized cloud computing platform.

For the example network environment 100 of FIG. 1, server 102 is an application server that executes one or more applications or processes 104 that processes data in the system using one or more nodes 108. One typical application is a data backup management application that coordinates or manages the backup of data from one or more data sources, such as other servers/clients to storage devices, such as network storage 114 and/or virtual storage devices, or other data centers. The data generated or sourced by system 100 may be stored in any number of persistent storage locations and devices, such as local client or server storage. The storage devices represent protection storage devices that serve to protect the system data through applications 104, such as a backup process that facilitates the backup of this data to the storage devices of the network, such as network storage 114, which may at least be partially implemented through storage device arrays, such as RAID (redundant array of independent disks) components.

In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays for use by a backup server, such as a server that may be running Networker or Avamar data protection software backing up to Data Domain protection storage, such as provided by Dell/EMC™ Corporation.

As shown in FIG. 1, system 100 includes an event injection (EI) process 112 that is executed by the system to simulate error conditions in that are timing related (i.e., involving a sequence of events occurring in a particular order in different components) that are very difficult to manually reproduce.

As a distributed system, the nodes and client/server computers of system 100 communicate with each other over network 110 via messages. Based on these messages, they perform certain acts like reading data from the disk into memory, writing data stored in memory to the disk, perform some computation (CPU), sending another network message to the same or a different set of components and so on. These acts, also called 'component actions' are executed in a specified time order by the associated component to constitute a distributed operation. Certain fault conditions may arise if a component fails or takes too long to complete an action and/or if the exact timing or sequencing is missed.

The event injection process 112 introduces, in a controlled and monitored manner, fault events in the system. A fault event is a special type of component action that is executed by a component in a node (or set of nodes) as a special action, such as either before or after an associated component action, between the execution of two component actions, in lieu of another component action, or as a stand-alone action. The recreation of an error condition will almost always require a sequence of individual error/fault events to occur in the distributed system in a predetermined timing-based order, and any user should be able to recreate the sequence of the error in more or less in the same order through the event injection process 112.

In an embodiment, process 112 uses a fault map that the user provides as an input to the event injection process. The fault map comprises directives to execute fault events that are sent as a series of fault event messages. These fault event messages contain all the required information to execute a fault event. This information includes an identification of the nodes that participate in this fault event, the action that each of them is to perform, and in the order in which the actions are performed.

The fault map is a global sequence or order of fault event messages, and is provided by the user and all the participating nodes and components following that global sequence. The global sequence should be set in such a way that an ordered execution of such a sequence would successfully simulate the desired error condition. In certain cases, the fault map may simply consist of just one message. The events (faults) in the fault map are executed in the same order as they appear in the fault map. This order of execution is ensured by the event injection process 112, which is itself a distributed component.

As shown in FIG. 1, process 112 may be a process executed by a specialized node, denoted Node 0 as a specially configured management or control node in system 100. Alternatively, it may be executed as a server process, such as by server 102 or any other server or client computer in the system. It should be noted that Node 0 may be implemented as a manager or controller node, or it may be embodied as one of the compute nodes 108.

The event injection process 112 works with the other components of the distributed system to make sure the fault event messages are delivered to all the nodes and components in such a way that the fault events are executed in the same order as intended. In the context of the distributed network 100, an event injection (EI) service or agent 106 runs on each compute node 108 in the distributed system. In an embodiment, the EI service may be implemented as a daemon process running in each node. As understood, a daemon is a computer program that runs as a background process, rather than being under the direct control of an interactive user. These EI daemons on every node communicate with each other (either via messages or shared memory) and also coordinate the order of the execution of the fault events by also delivering the events to the appropriate component for execution. The EI daemons 106 constantly interact within themselves as a peer-to-peer service and also with the components that participate and execute faults. The components that service and execute faults have pre-defined APIs (registered with event framework) that are invoked from the event framework to execute the fault events.

Since most of the processing in a distributed system is driven by messages, the event framework module needs very close coordination with the messaging layer of network 110. This messaging layer is also known as the communication library. In most distributed systems, upon the receipt of a message by the messaging layer, the message is examined to the component to which the message belongs, and the corresponding procedure (or function) of that component is invoked. This invocation is typically also known as message callback. These message callbacks execute the logic of the component actions. To ensure orderly execution of the fault events, the messaging layer is modified to recognize fault messages and execute the fault action appropriately including faults that need to be executed within the messaging layer. In an embodiment, a message such as Notify_And_Wait_Before_Send is defined to cause the system to recognize fault messages and execute the fault action.

If the fault is associated with another component, the appropriate callback is called with the corresponding API. In special cases where a fault indicates that a fault action needs to be taken before or after an component action (or message callback), the messaging layer handles it by executing the fault event just before or after the message callback.

In an example implementation, an application named "cluster tag service" was tested using an event injection process 112 to simulate many timing related error conditions in an example distributed system. Upon reproducing these error conditions, the corresponding defects in the underlying code can be discovered and fixed. Many other applications can also be examined using such a process 112 in conjunction with respective node EI agents 106. The EI process 112 uses the underlying protocols of network 110 to utilize timing related interactions and thereby simulate any conflicts or miscommunication that can result in system and program execution errors.

As stated above, the nodes 108 of system 100 communicate via messages to perform certain acts like reading data from the disk into memory, writing data stored in memory to the disk, performing computations, sending messages, and so on, in component actions. For example, in a distributed data management system, a distributed operation Write_To_All could be to simply write a data value X to the disk in all the nodes. FIG. 2 is a table 200 that illustrates a typical flow of actions for an example write operation. Table 200 lists a sequential series of actions 202 performed by certain nodes listed in column 204, and the associated component 212, with the action to be performed, 208. The example of FIG. 2 assumes a three-node system (N1, N2, N3), where N2 is the coordinator node. As the controller node, N2 sends the message to another node (N1), and the example sequence proceeds through Actions 1 to 9 as shown. Table 200 is a simple example of a possible action sequence, and any other operation sequence can be used. Moreover, certain operations may be performed in parallel, even though they are serialized for purposes of illustration. For example, in FIG. 2, actions 1, 2, 3, 4 and 5, 6, 7, 8 can be done in parallel instead of in serial, as shown.

As can be seen in even the simple example of FIG. 2, testing for error conditions can be challenging when such an error condition involves multiple components acting in a certain predetermined order, as they can be nearly impossible to manually reproduce. However, such error conditions are the ones that are typically most expected to be reproduced in real-life deployments of the distributed system. Therefore, it is imperative that such error conditions are simulated as much as possible and those simulations are used to identify design challenges and defects in the underlying code.

As described above, the event injection process 112 simulates timing-based error conditions in a distributed system by first defining a fault event as a special type of component action that is executed by a component in a node (or set of nodes) as a special action executed before or after an associated component action, between two component actions, instead of another component action, or as a stand-alone action. A fault map is used to execute fault events that are sent via a series of fault event messages by defining a global sequence or order of actions to be performed by certain nodes in a specific sequence in such a way that the ordered execution of the fault map simulates the desired error condition.

For the Write_To_All operation of example of FIG. 2, assume that a particular error condition is to be injected in which one of the nodes failed to write to disk. To introduce that error condition, an example fault message would be created for a node (e.g., N3) instructing that the DiskWriter component in N3 would need to fail the write to disk operation (fault event) upon receiving a write message from N2. FIG. 3 is a table 300 that illustrates an example fault event message (fault map) for the operation sequence of FIG. 2. Table 300 lists faults by fault number, fault type, executing node, remote node, component, and action. The example fault map of FIG. 300 shows that a FailDiskWrite fault is committed on node N3, where the DiskWriter component fails a "Write to disk" operation. This fault event means that on node N3, whenever there is a "Write to disk" message sent by Node N2, Node N3 instead of executing that component action of writing to disk will fail that write. It will do that for the first message that it receives to write to disk.

The event injection process 112 will internally ensure that the fault map messages are delivered and executed upon in the right order. FIG. 4 is a table 400 that illustrates the operation sequence of FIG. 2 proceeding with the fault of FIG. 3. With the introduction of the fault, the previous distributed operation of Table 200 proceeds as shown in Table 400 with Action 7 failing the disk Writer Action in Node N3. It is important to note that due to this injected fault, Action 7 failed and thereby Action 8 returned a different result, i.e., that the requested write has failed.

FIG. 2 through 4 illustrate a relatively simple sequence of operations for purposes of description. A more typical deployment example might be to have a distributed key value store that relies heavily on coordination of node level transaction managers to write a distributed transaction. In this case, it may be desired to introduce a complicated error condition while executing a distributed write operation. The error condition itself would require a set of fault messages to be executed in a distributed serial order.

FIG. 5 is a table 500 illustrating an example fault map for a distributed write operation, under an example embodiment. The example error condition to be introduced is that the coordinator node N2 sends a "Write to Disk" message to another node N1 immediately after N1's local transaction manager process has hit an internal bug and has shutdown. As shown in table 500, to simulate this condition, the fault map injects three faults in the system that need to be executed in order. The event process 112 coordinates the delivery of the fault map 500 to each participating node/component and ensures that the faults are executed in the specified order in the fault map. This means that the event framework will drive the execution schedule of the faults. For the example of FIG. 5, the process 112 will execute fault 1 first, thereby making the participating component (Messaging Layer) of N3 wait before sending the message. Only after successful execution of fault 1, will it execute fault 2 to shut down the transaction manager process on N2. Upon completion of fault 2, it will then execute fault 3, which is to wake up the component that was put in wait state and the component then resumes normal execution from there on. All this coordination and orchestration is done by the event injection process 112.

Figure 6:
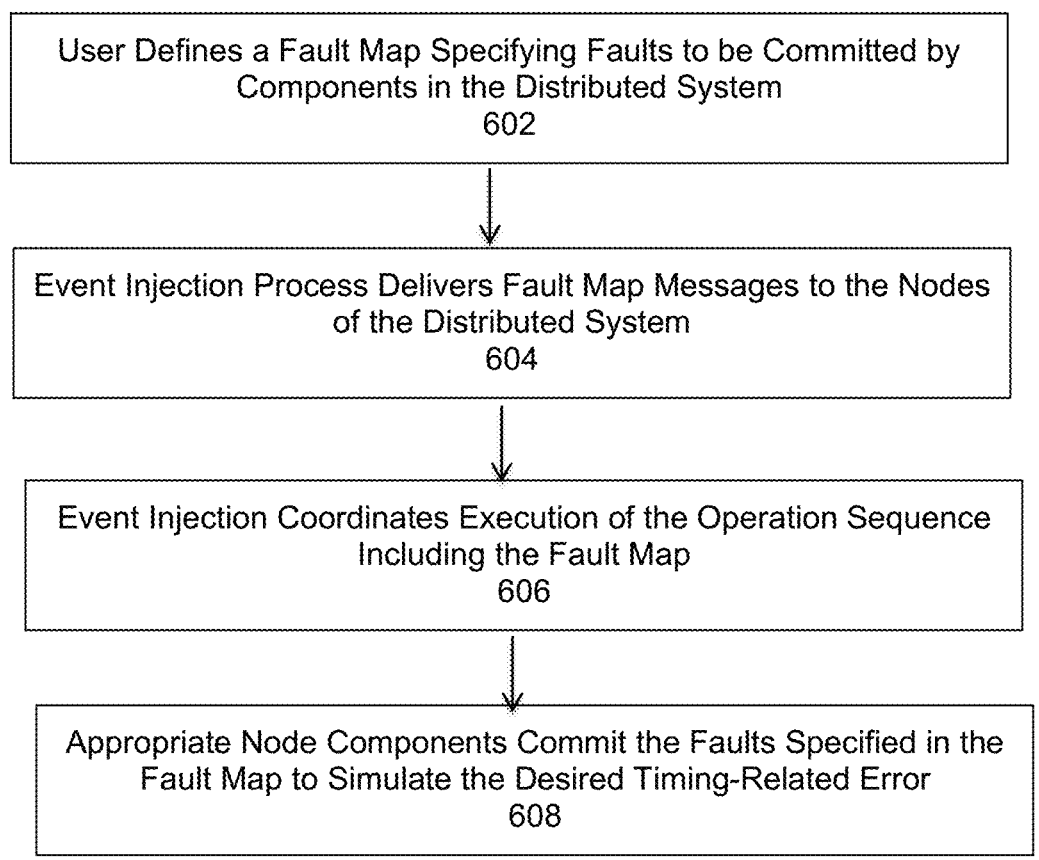
FIG. 6 is a flowchart that illustrates a method of simulating timing-related error condition in a distributed system, under some embodiments.

FIG. 6 is a flowchart that illustrates a method of simulating timing-related error condition in a distributed system, under some embodiments. The process 600 of FIG. 6 begins with the user defining a fault map specifying one or more faults to be committed by components in the distributed system, 602. These generated fault events are to be executed in different components of the distributed system in a serialized distributed order. The event injection process 112 delivers the fault map messages to the nodes in the distributed system, 604. The nodes then execute an operation sequence containing the fault events in the proper order as coordinated by the event injection process, 606. The faults are then committed by the associated components in the nodes, 608. Execution of these fault events occurs before, after or during a regular component procedure or action to simulate the desired timing-related error. The use of a fault map and the coordination of the event injection process allows a user to specify where an error/fault can be injected on one node depending on a user configurable set of events for the distributed system.

The process 600 of FIG. 6 allows for the scheduling and execution of the fault events (in a map) in a serialized distributed order where the system is implemented using a distributed event injection framework. The event injection process manages the coordination and delivery of these fault events to their corresponding nodes and components. The process relies on individual event injection instances/processes in each node that interact as peers and communicate with each other. The event injection instance (daemon process) in each node communicates and executes the individual events in the associated components. The event injection instance/process in each node ensures that fault events in a map are executed in order to simulate the desired error condition.

Embodiments of the event injection process can also be used to inject errors in a distributed key value store by modifying some of the associated components of a distributed key value store, e.g., the messaging layer.

With respect to certain implementation processes, a defined event injection tool can be used by a network client to add and/or execute events/faults in a sequence, such as by using a Command Line Interface (CLI) command 'fi_tool' (fault injection tool). As a first step, the client adds the fault using and 'add fault' (or similar) command to add multiple faults in a sequence. At this time the fault is just recorded in the system but not injected or executed. Next, the client uses an 'inject fault' (or similar) command to inject the events to distributed system after adding all the required faults in sequence. The execution of the faults happens after the faults are injected automatically based on fault-map sequence. The client can issue a 'clear fault' (or similar) command to clear any injected faults from the system. This will clear/rollback all the faults and put the system to original state.

Figure 7:
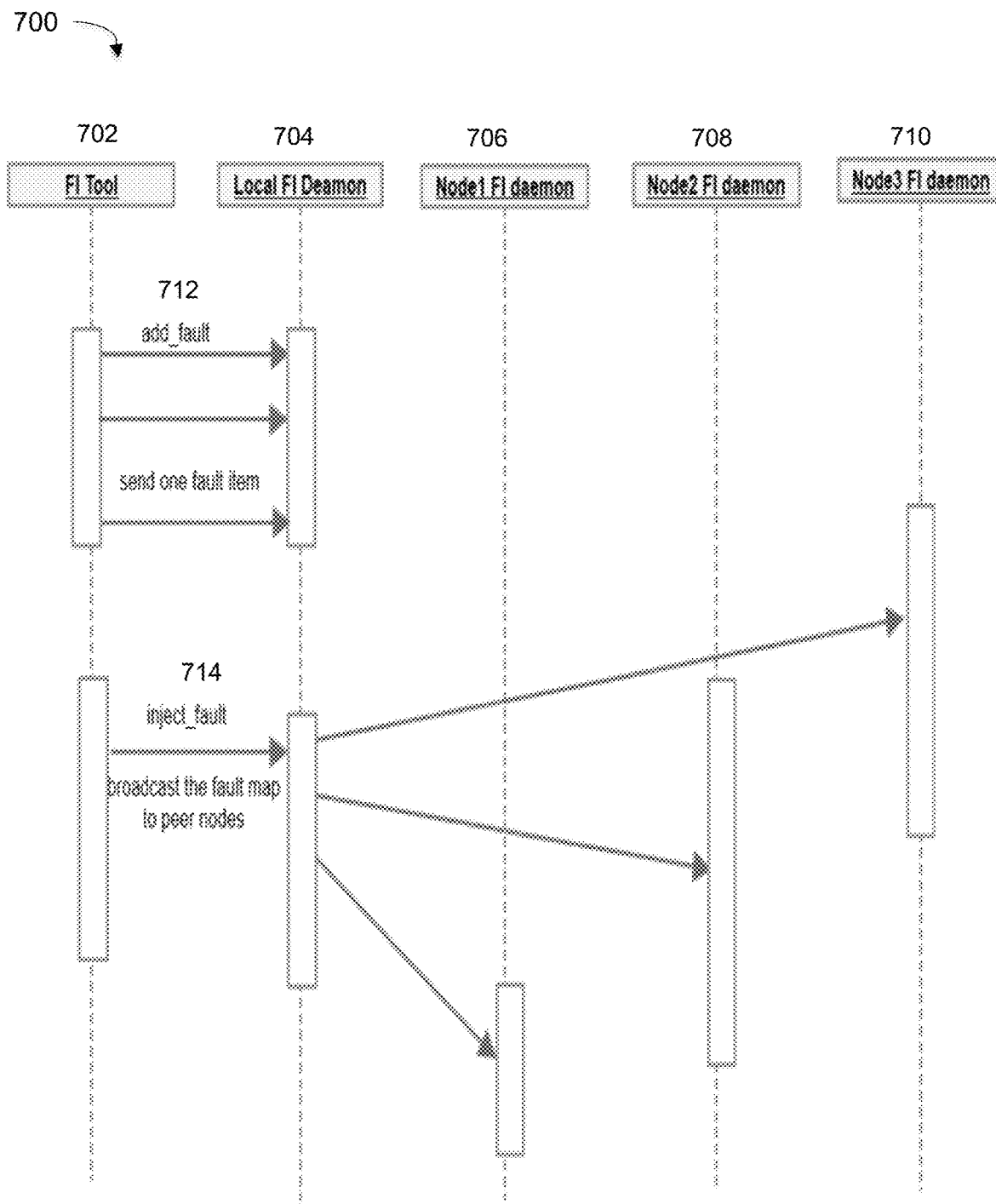
FIG. 7 is a flow diagram illustrating a fault add and injection process, under some embodiments.

FIG. 7 is a flow diagram illustrating a fault add and injection process, under some embodiments. Diagram 700 illustrates some example steps performed by example distributed network components including fault injection (FI) tool 702, a local FI daemon process 704, a Node N1 FI daemon, 706, a Node N2 FI daemon, 708, and a Node N3 FI daemon, 710, for a three-node system, such as described with respect to the example embodiment of FIG. 2. As shown in diagram 700, the fault map is generated by fault addition process (add_fault) 712 where FI tool 702 adds one or more faults to the local FI daemon, 704. This fault addition will record the faults in a sequence/table, but does not include injection, which is a separate process 714.

As shown in FIG. 7, the fault injection process (inject_fault) 714 involves the FI tool 702 broadcasting the fault map through the local FI daemon 704 to the respective F1 daemons in each of the Nodes 706, 708, and 710, using peer-to-peer communications.

The execution of the faults occurs after fault injection, however, execution of each fault may depend on other events. For example, if a fault is supposed to trigger only after the occurrence of some other event, the injection will wait until that operation/event occurs. This guarantees that faults will always be executed in the proper sequence.

Figure 8:
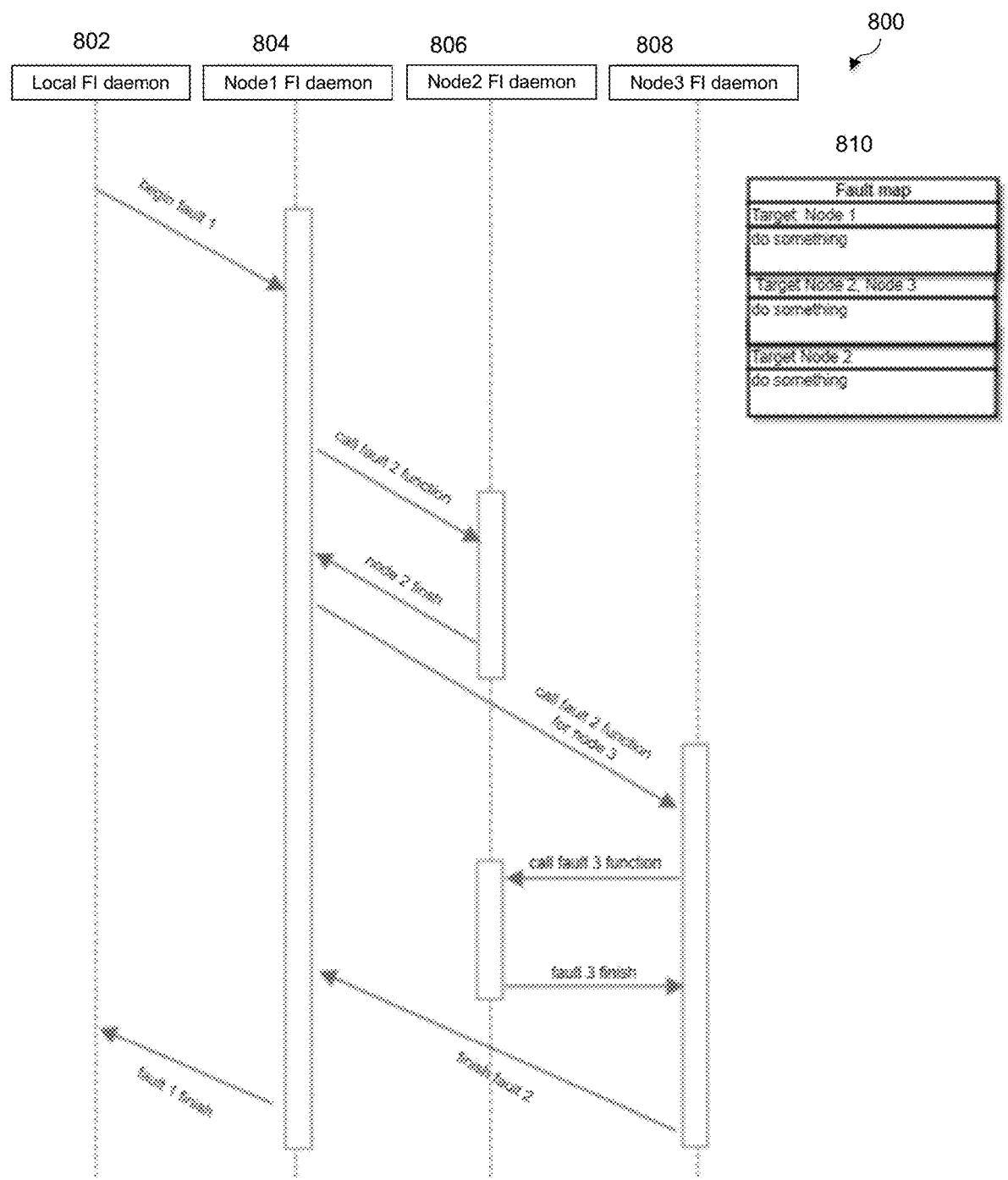
FIG. 8 is an example of a fault execution sequence for the injected faults of FIG. 7, under an example embodiment.
Figure 9:
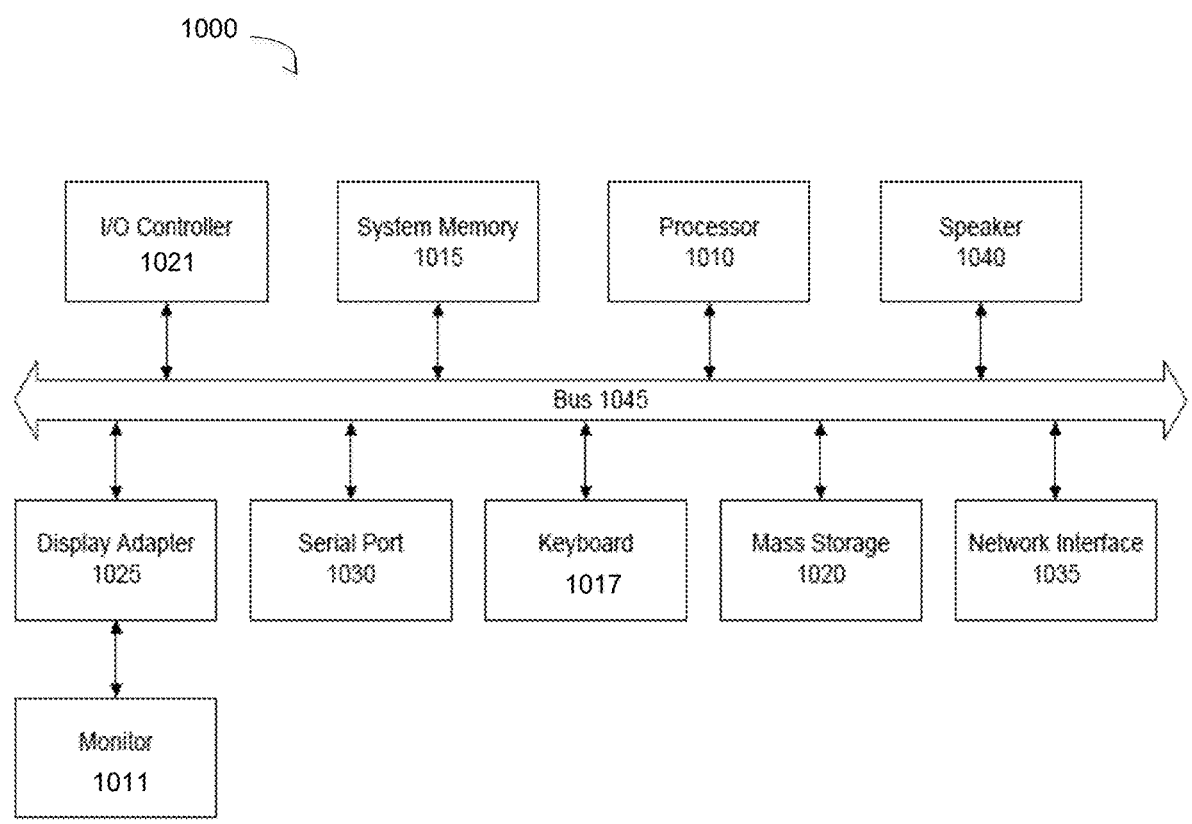
FIG. 9 is a block diagram of a computer system used to execute one or more software components of an event injection process for simulating error conditions in a distributed system, under some embodiments.

FIG. 8 is an example of a fault execution sequence for the injected faults of FIG. 7, under an example embodiment. As shown in diagram 800 of FIG. 8, an example fault map 810 is to be executed on Nodes 1, 2, and 3. The local FI daemon 802 begins fault 1 through the Node1 FI daemon 804. This, in turn calls the fault 2 function through the Node2 FI daemon 806, When node 2 is finished with this fault, the fault 2 function is called for Node 3 using the Node3 FI daemon 808, and so on, until the three faults in the fault map 810 are all triggered.

With regard to error condition simulation, FIG. 8 illustrates a distributed system of three nodes (N1, N2, N3), where N1 is the coordinator node. Node N1 sends COMMIT WRITE message to all nodes (N2, N3) to perform a global write operation. As shown in FIG. 8, the error scenario is: N2 process X (participating in write operation) shuts down right before message is sent from N1 to N2. The fault map 810 should target the following: Shutdown Process X on node 2 right before N1 sends COMMIT_WR message to Node N2. The Corresponding commands to inject faults can be as follows:

Phase 1: Client Adds fault in a sequence No faults are executed yet fi_tool add_fault --component COMM --node n1 --msg_type COMMIT_WR --src n1 --dst n2 --event NOTIFY_BEFORE_SEND fi_tool add_fault --component PROCESS --node n2 --pname X --event SHUTDOWN_PROCESS fi_tool add_fault --component COMM --node n1 --msg_type COMMIT_WR -src n1 -dst n2 --event NOTIFY_RESUME Phase 2: Client injects faults; faults are executed based on the order of the fault map.

fi_tool inject_fault_map // inject fault will broadcast the fault map to peer nodes and start the fault inject sequence Phase 3: Post execution, client can clear the faults to bring the system back to original.

fi_tool clear_fault_map

Any appropriate data structure and interface can be used to define the data elements described herein. For example, an example fault map structure may be defined as:

```
// Fault-Map structure
struct fault_map_t {
   fault_map_step_t fault_map[MAX_FAULTS]; // Array of fault events
}
// Fault-info
struct fault_map_step_t {
   char target_node[255];   // Fault-execution node
   fi_component_tf_component; // Component where fault needs to be injected
   fi_notify_arg_targ;                  // Fault event message
};
// Components that's recognizes fault-events
enum fault_component_t {
    FI_COMPONENT_INVALID,
    FI_COMPONENT_COMM,      // Messaging/Communication layer
    FI_COMPONENT_DISK,      //  DISK Writer
    FI_COMPONENT_PROCESS,   // Shutdown , restart process
    FI_COMPONENT_NETFILTER, // Iptables and Netfilter component
};
union fi_notify_arg_t {
    struct comm_event_tcfault; // communication layer fault
    struct io_event_tiofault; // Disk operation related fault
    struct process_event_tpfault;  // Process related fault
    struct netfilter_event_tnetfault; // Iptables,netfilter related fault
}
```

Some example definitions corresponding to component fault event definition are provided as follows:

```
// Communication component fault info
   struct comm_event_t {
      char src_node[255];  // Source node of a message
      char dst_node[255];   // Destination node of a message
      msg_type_t       msg; // message where fault needs to be injected e.g. COMMIT_WRITE
      comm_op_top; // FAULT-EVENT INFO e.g.
   NOTIFY_BEFORE_SEND, NOTIFY_ON_RECV etc..
   };
```

In an embodiment, the event injection process 112 monitors faults that are added, triggered, and executed through log files. This monitoring is used to inform the user that an expected fault (simulated fault) occurred in response to the fault map. In this process, the user first provides a fault map. For example, the fault map may be as follows:

Fault Event-shutdown_disk_writer to be injected just before a 'commit msg' is sent from a distributed_key_val_store process on a node as part of write_key_val operation.

For this fault map, when 'commit msg' is about to be sent (as part of write_key_val operation), the fault event is executed and logged on a certain node. The user knows where and when the fault will occur and can monitor the log file to verify if events actually got injected or not. With this monitoring, the user can thus determine if the application being tested (in this case the distributed_key_value_store) is working as expected, which is to see a failed write_key_val operation. Thus, the monitoring operation provides an indication of when a fault-event occurs as the user expects for the application being tested. By behaving in a certain way and in accordance with a user defined fault map, the user can find defects in the application or system.

Although embodiments described the generation of the fault map using CLI mechanisms, other methods can also be used, such as through the use of a Yaml file (or other human readable data serialization language) for the fault-map. For this embodiment, the system records a number of fault-maps in the FI database and executes them as and when needed. The system includes a tool that allows users add faults via CLI and record it in a yaml file. The yaml file can then be applied when faults needs to be injected. The Yaml file contains the information related to fault-map and the sequence of faults to be executed, including: (1) name of the fault-map, (2) notifications/reporting related to fault-injection sent to an email address, (3) log file location on each node where the faults related trace messages are aggregated, and (4) fault-map sequence and data related to each fault. The report (2) contains: (a) fault-map name, (b) faults injected, (c) faults executed, and (d) errors.

Programming code for an Example of the FAULT-MAP Yaml file is as follows:

```
Fault_map_name: <Fault-map-name>
Fault_map_notification: <email>
Fault_map_log_file: <log_file>
Fault_1:
    Fault_Component: MESSAGING_LAYER
    Fault_event_msg: "NOTIFY_WAIT_BEFORE_SEND"
    Node: "N2"
    SRC_node: "N2"
    DST_node: "N3"
    Msg_type: "CTS_COMMIT_WRITE"
Fault_2:
    Fault_Component: DISK_WRITER
    Fault_event_msg: "SHUTDOWN"
    Process_name: "X"
    Node: "N3"
Fault_3:
    Fault_Component: MESSAGING_LAYER
    Fault_event_msg: "NOTIFY_RESUME_SEND"
    Node: "N2"
    SRC_Node: "N2"
    DST_node: "N3"
    Msg_type: "COMMIT_WR"
```

The client can inject the Yaml fault map using an appropriate FI tool, such as: fi_tool_inject -f fi.yaml.

System Implementation

FIG. 8 is a block diagram of a computer system used to execute one or more software components of an event injection process for distributed systems, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac™ OS X, IRIX32, or IRIX64. Other operating systems may be used.

Although certain embodiments have been described and illustrated with respect to certain example network topographies and node names and configurations, it should be understood that embodiments are not so limited, and any practical network topography is possible, and node names and configurations may be used.

Embodiments may be applied to data, storage, industrial networks, and the like, in any scale of physical, virtual or hybrid physical/virtual network, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

Some embodiments of the invention involve data processing, database management, and/or automated backup/recovery techniques using one or more applications in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Although embodiments are described and illustrated with respect to certain example implementations, platforms, and applications, it should be noted that embodiments are not so limited, and any appropriate network supporting or executing any application may utilize aspects of the backup management process described herein. Furthermore, network environment 100 may be of any practical scale depending on the number of devices, components, interfaces, etc. as represented by the server/clients and other elements of the network. For example, network environment 100 may include various different resources such as WAN/LAN networks and cloud networks 102 are coupled to other resources through a central network 110.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of simulating timing-related error conditions in a distributed system, comprising:
    allowing a user to define a fault map specifying one or more faults to be committed by components in the distributed system, wherein the generated fault events are to be executed in different components including a plurality of nodes in a serialized distributed order, and comprising one or more compute nodes and a controller node executing the event injection process, wherein each node executes a fault injection daemon process controlled by the controller node;
    delivering, by an event injection process, fault map messages to each node of the plurality of nodes;
    executing in each node, an operation sequence containing the fault events in the proper order as coordinated by the event injection process; and
    committing, by associated components in one or more nodes of the plurality of nodes, the fault map faults to simulate a desired timing-related error, the components communicating using a peer-to-peer messaging service of a data and control network coupling the compute nodes and the controller node in the system, wherein the messaging service includes a Notify_And_Wait_Before_Send command to cause the system to recognize fault messages and perform orderly execution of the fault events.

2. The method of claim 1 wherein fault events are injected in between component actions to be executed in a specified time order by the associated components, and wherein execution of the fault events occurs before, after or during a regular component procedure or action for the operation sequence.

3. The method of claim 2 wherein the component actions comprise at least one of: reading data from a disk into memory, writing data stored in memory to the disk, performing a computation, sending a network message to a same or a different set of components, and wherein a fault condition to be simulated occurs if a component fails or takes too long to complete an action, or if an exact timing or sequencing is missed.

4. The method of claim 1 wherein the fault map comprises directives to execute fault events that are sent as a series of fault event messages.

5. The method of claim 4 wherein the fault event messages comprise information including: an identification of any nodes that participate in the fault event, the action that each of the any nodes is to perform, and an order in which the actions are performed.

6. The method of claim 1 further comprising receiving a clear fault command from a network client to clear the injected faults and restore the system to an original state.

7. A method of simulating timing-related error conditions in a distributed system, comprising:
    defining a fault map to be distributed from a controller node of the network to a plurality of other nodes in the network, the fault map comprising a global sequence of fault event messages, wherein execution of the sequence simulates a specific error condition of the network;
    distributing the fault map from the controller node to the other nodes through an event injection process communicating among the nodes using a peer-to-peer messaging system and communicating between a fault injection daemon process in the controller node and a respective daemon process running on each of the other nodes, wherein event injection process is used to inject errors in a distributed key value store by modifying some of the associated components of a distributed key value store including a messaging layer; and
    executing in the other nodes, the global sequence of fault event messages in a proper order as coordinated by the event injection process to simulate the specific error condition.

8. The method of claim 7 wherein fault events of the global sequence are injected in between component actions to be executed in a specified time order by the components, and wherein execution of the fault events occurs before, after or during a regular component procedure or action for the operation sequence.

9. The method of claim 8 wherein the component actions comprise at least one of: reading data from a disk into memory, writing data stored in memory to the disk, performing a computation, sending a network message to a same or a different set of components, and wherein a fault condition to be simulated occurs if a component fails or takes too long to complete an action, or if an exact timing or sequencing is missed.

10. The method of claim 7 wherein the fault event messages information including: an identification of the nodes that participate in this fault event, the action that each of node is to perform, and an order in which the actions are performed.

11. The method of claim 7 further comprising receiving a clear fault command from a network client to clear the injected faults and restore the system to an original state.

12. A system for simulating timing-related error conditions in a distributed system, comprising:
    a controller node of a network defining a fault map to be distributed to a plurality of other nodes in the network, the fault map comprising a sequence of fault event messages, wherein execution of the sequence simulates a specific error condition of the network;
    an event injection component distributing the fault map from the controller node to each node of the plurality of other nodes through communicating among the nodes using a peer-to-peer messaging system, and communicating between a fault injection daemon process in the controller node and a respective daemon process running on each of the other nodes, wherein event injection process is used to inject errors in a distributed key value store by modifying some of the associated components of a distributed key value store including a messaging layer; and respective node components executing in the other nodes, the sequence of fault event messages in a proper order as coordinated by the event injection process to simulate the specific error condition.

13. The system of claim 12 wherein the plurality of nodes communicate with each other using a peer-to-peer messaging service of a data and control network coupling the controller node and the plurality of other nodes in the system.

14. The system of claim 13 wherein the component actions comprise at least one of: reading data from a disk into memory, writing data stored in memory to the disk, performing a computation, sending a network message to a same or a different set of components, and wherein a fault condition to be simulated occurs if a component fails or takes too long to complete an action, or if an exact timing or sequencing is missed, and wherein the fault event messages information including: an identification of the nodes that participate in this fault event, the action that each of node is to perform, and an order in which the actions are performed.

* * * * *